United States Patent [19]
Burg

[11] 3,760,490
[45] Sept. 25, 1973

[54] MACHINE TOOL HAVING TOOL CHANGER

[75] Inventor: Fred G. Burg, Los Angeles, Calif.

[73] Assignee: Houdaille Industries, Inc., Buffalo, N.Y.

[22] Filed: July 13, 1971

[21] Appl. No.: 162,226

[52] U.S. Cl. ............................................... 29/568
[51] Int. Cl. ............................................ B23q 3/157
[58] Field of Search ........................... 29/568, 26 A; 90/11 A

[56] References Cited
UNITED STATES PATENTS

| | | | |
|---|---|---|---|
| 3,355,797 | 12/1967 | Lohneis | 29/568 |
| 3,200,492 | 8/1965 | Lehmkuhl | 29/568 |
| 3,136,563 | 6/1964 | Swanson et al. | 29/568 |
| 3,545,075 | 12/1970 | Ollegro | 29/568 |
| 3,259,957 | 7/1966 | Stobbe | 29/26 A |
| 3,191,260 | 6/1965 | Jorgensen | 29/26 A |
| 3,545,335 | 12/1970 | Lehmkuhl | 90/11 A |

Primary Examiner—Andrew R. Juhasz
Assistant Examiner—Z. R. Bilinsky
Attorney—Carlton Hill et al.

[57] ABSTRACT

A machine tool includes a head which supports a vertically movable quill within which there is disposed a rotatable spindle to which various kinds of cutting tools may be attached. A pair of tool storage magazines are respectively disposed at opposite sides of the quill for rotation about a common horizontal axis. A pair of tool transfer arms are independently supported on the head, and each has gripping means that are movable between a first position where a tool held thereby is aligned with the spindle, and a second position where a tool can be transferred to or from one of the storage magazines. The spindle is driven through a two-ratio gear train that includes clutches for respectively selecting one of the speed ratios. On energization of both clutches, they jointly serve as a spindle brake. The quill is driven vertically by means that are concentric with the rotational axis of the spindle.

38 Claims, 9 Drawing Figures

MACHINE TOOL HAVING TOOL CHANGER

BACKGROUND OF THE INVENTION

1. Field of the Invention

This invention relates to machine tools, and more specifically to one having a rotary tool-holding spindle which is provided with an automatic tool changer.

2. Prior Art

A variety of machine tools having tool changers for changing or transferring rotary cutting tools have previously been manufactured or suggested. Various shortcomings have been noted which are disadvantageous. For instance, some machines are not capable of handling a large workpiece. Some are incapable of changing a tool in close proximity to the workpiece. Some require that the workpiece-supporting table be retracted while others require that the head that supports the cutting tool during operation be retracted. Some require the use of special coded tooling and in doing so inherently have attendant complexities. Others have a tool gripping arm which holds tools at opposite ends and rotates 180°, whereby one end of such arm must wait until the function of the other end of such arm is completed before moving.

SUMMARY OF THE INVENTION

According to this invention, a machine tool is provided which has a vertically moving head on which a spindle-supporting quill is reciprocable, the spindle being rotatable. Further, a pair of tool storage magazines are supported at opposite sides of the quill for independent rotation about a common horizontal axis, the head supporting a pair of tool transfer arms, one for each tool storage magazine, each arm respectively cooperating with the same spindle, one at a time, and remaining in its down position during machining and remaining in the tool storage magazine during rotation thereof. Further, the spindle drive includes a gear train that has two clutches for selecting one of two speed ratios, said clutches jointly comprising a brake when both are energized. Further, a vertical drive is provided on the quill which acts concentrically with the tool.

Accordingly, it is an object of the present invention to provide a machine tool having a tool changer for changing rotary cutting tools wherein less time is required to effect such change than is possible with prior devices.

A further object of the present invention is to provide means for braking the spindle without use of any brake structure per se.

A further object of the present invention is to provide means for reciprocating a rotary cutting tool along its rotational axis without tending to cock the cutting tool to a position of out-of-alignment.

Yet another object of the present invention is to provide a machine tool of the type described which enables the handling of a large workpiece.

A still further object of the present invention is to provide a machine tool of the type described that enables changing of tools close to such workpiece.

Yet another object of the present invention is to provide a machine tool of the type described wherein the tool transfer arm that has delievered a tool to the spindle remains in a stationary position during transfer to and from the spindle and during machining.

A still further object of the present invention is to provide a machine tool of the type described wherein the tool changer arm remains in the tool storage magazine area not only during transfer of a tool to and from such magazine, but also during the rotation or indexing thereof.

Another object of the present invention is to eliminate any need for workpiece table retraction during tool change, to eliminate any need for changing the position of the head during tool change, to eliminate any need for coded tooling, and to eliminate the time delay that inherently arises when one tool transfer arm can grip two tools at the same time.

Many other advantages, features and additional objects of the present invention will become manifest to those versed in the art upon making reference to the detailed description and the accompanying drawings in which a preferred structural embodiment incorporating the principles of the present invention is shown by way of illustrative example.

AS SHOWN ON THE DRAWINGS

Figure 1:
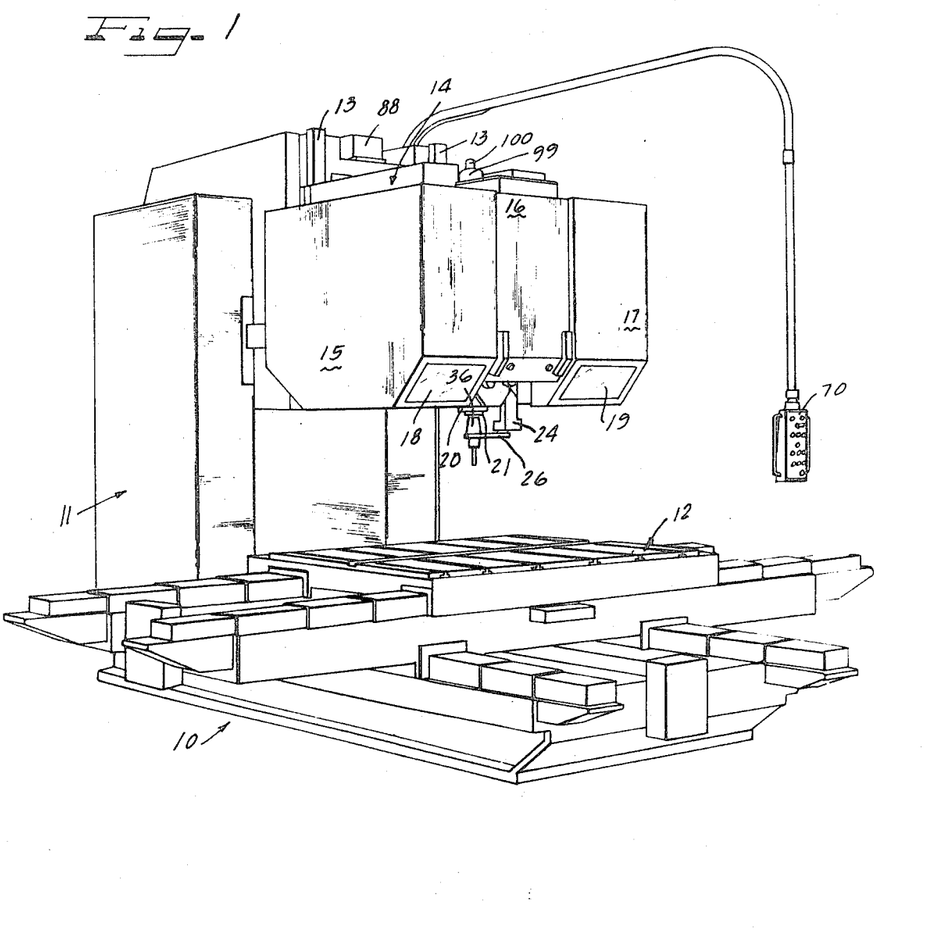
FIG. 1 is a perspective view of a machine tool having tool changing means provided in accordance with the principles of the present invention.

The principles of the present invention are particularly useful when embodied in a machine tool such as shown in FIG. 1 generally indicated by the numeral 10. The machine tool 10 includes a frame 11 which supports a workpiece-supporting table 12 in a known manner. The frame 11 has a pair of vertical ways 13, 13 on which a head 14 is slidably and adjustably disposed. The head 14 comprises a rigid casting or weldment to which various components are secured which are enclosed by a number of covers 15, 16, and 17. If desired, the covers 15 and 17 may be provided with windows 18, 19. Normally, the machine tool 10 is controlled by conventional numerical control circuitry for automatic operation and/or a set of manual controls 70. Certain novel aspects of the present machine as it relates to such otherwise conventional control system are set forth later herein.

Figure 2:
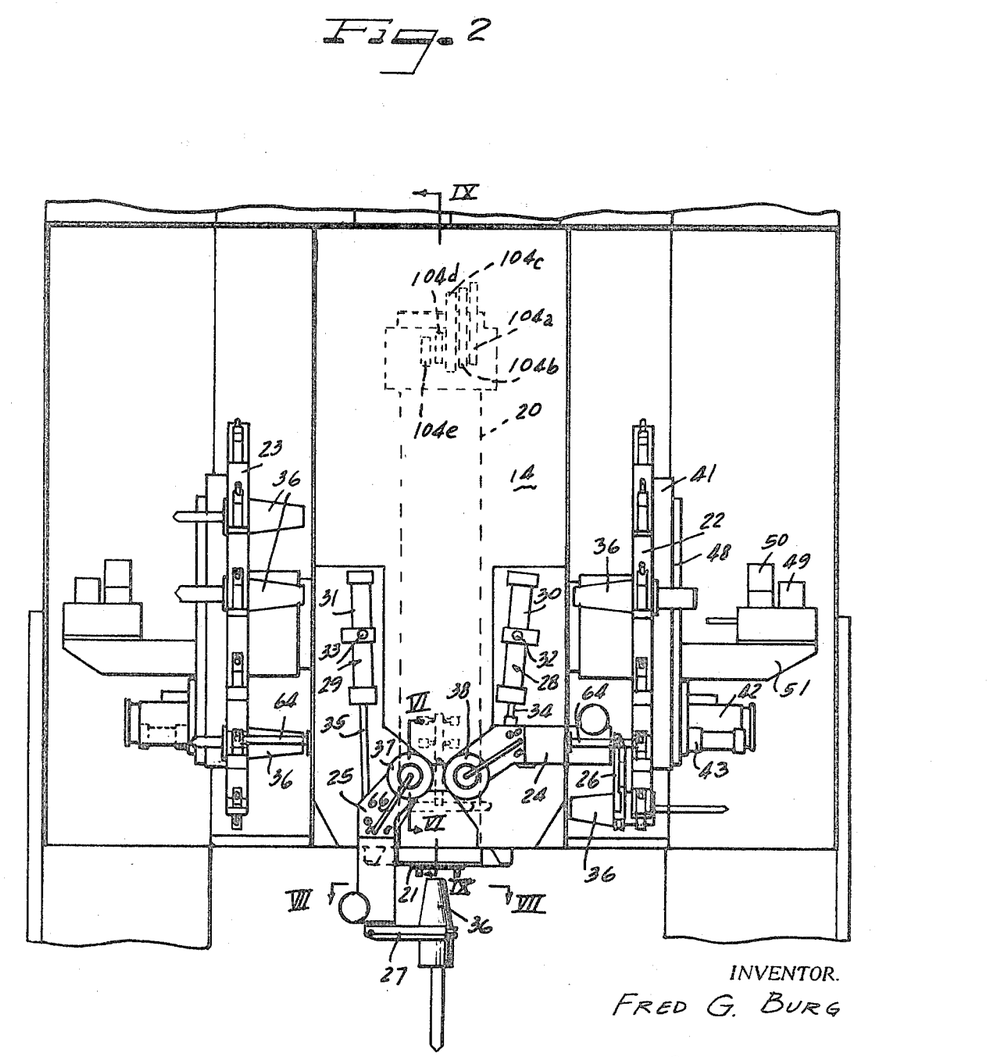
FIG. 2 is an enlarged front view of the head thereof, portions of the machine tool being broken away and the cover being shown in cross section.

As shown in FIG. 2, the head 14 supports a quill 20 within which there is disposed a spindle 21. To the right side of the head 14 there is rotatably supported a first tool storage magazine 22 and on the left side of the head 14, there is disposed a second tool storage magazine 23. A pair of tool transfer arms 24, 25 are secured to the front of the head 14 and each is provided with a gripping means 26, 27 which are fluid actuated as explained hereafter. A pair of fluid actuators 28, 29 respectively act between the head 14 and the tool transfer arms 24, 25. Each of the fluid actuators 28, 29 includes a cylinder 30,31 pivoted as at 32,33 on the head 14, each of the actuators 28,29 including a rod 34,35 pivotally connected to the arms 24,25 intermediate their ends.

Each of the various tools that are to be used is secured to an adapter 36 onto which the gripping means 26,27 is adapted to grasp. The details of the gripping means 26, 27 are provided later herein.

The actuators 28,29 are normally simultaneously actuated, one being retracted while the other is being extended. By the arrangement shown, each can impart about 90° of movement to the associated tool transfer arm 24,25. The tool transfer arms 25 are pivoted on the head 14 and can be moved between a first position or down position such as shown for the tool transfer arm 25 in FIG. 2, and a second position or up position such as shown for the tool transfer arm 24 in FIG. 2. Thus there is a pivotal connection 37,38 between one end of the arms 25,24 and the head 14, with the gripping means 26,27 being disposed at the other end of such tool transfer arms 24,25. Thus each tool transfer arm 24,25 has a portion that can be disposed substantially vertically and also substantially horizontally, both as shown. Either tool transfer arm 24,25 may be retracted and extended with the other such arm held retracted. This enables eight modes of tool changer operation.

The hydraulically actuated gripping means 26,27 are adapted to hold the tool through its adapter 36 coaxially with the spindle 21 and are adapted to both grip and release such tool adapter 36.

In operation, both of the pivotal connections 37,38 are driven in one direction, such as counterclockwise, to respectively return one tool to the storage magazine 22 and to bring another tool from the tool storage magazine 23 to the position shown in FIG. 2. This movement involves a simultaneous move of the tool transfer arms 24,25. The quill 20 is then extended downwardly and a connection is made between it and the tool adapter 36 whereupon the gripping means 27 is released. The gripping means 27 swings sufficiently out of the way so that the quill 20 can be advanced past the same without retraction of the tool transfer arm 25 whereupon tool advance and cutting takes place. When the cutting operation is completed, the quill 20 retracts to place the tool vertically in the position shown, whereupon the gripping means 27 regrasps the tool adapter 36. Once this has been completed, the connection between the spindle 21 and the tool adapter 36 is released, whereupon the spindle may retract to the position shown.

In the meantime, without any need for any further coordination, the tool transfer arm 24 has placed its tool in the storage magazine 22 after which the gripping means 26 is released. Again the gripping means have sufficient movement so that the magazine 22, even though loaded with tools in all of its stations, can rotate so as to bring the next tool to be used in line with the gripping means 26, which can then beoperated to grip such next tool. When these separate movements of the tool transfer arms 24,25 have been respectively both completed, the actuators 28,29 are once more operated so as to raise the transfer arm 25 and to lower the tool transfer arm 24. As the structure is symmetrical, the operation just described is repeated but using the components on the opposite side of the head 14.

TOOL STORAGE MAGAZINES

Figure 3:
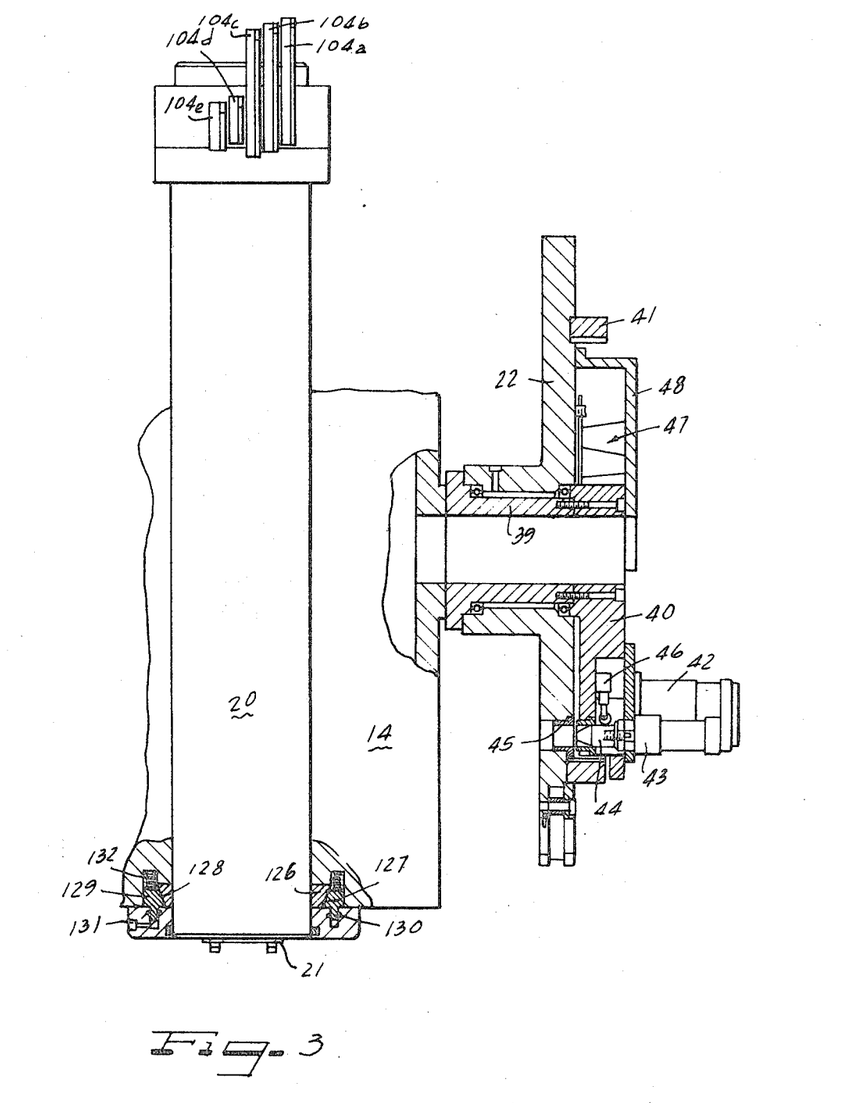
FIG. 3 is a further enlarged view of a portion of the structure shown in FIG. 2, additional portions being shown in cross section.

As best seen in FIG. 3, the head 14 supports a hollow hub 39 which is bolted thereto at one end, while at the opposite end of the hub 39 there is a flange 40 bolted thereto. The hub 39 rotatably supports the tool storage magazine 22 on a pair of bearings. The tool storage magazine 22 has a ring gear 41 which meshes with the pinion of a hydraulic motor 42 supported on the flange 40. The flange 40 further supports an actuator 43 to which is secured a reciprocable shot pin 44 which can be driven into one of a series of holes 45 provided by inserts carried in the tool storage magazine 22. There is one such hole 45 for each position that a tool can be stored in the magazine 22, whereby a selected tool can be accurately located about the axis of the hub 39 for cooperation with the gripping means 26. An interlock switch 46 forms part of the control system for indicating whether the shot pin 44 is retracted or advanced. Various other controls 47 are secured to the flange 40 under a cover 48 and form part of the control system for signaling which tool storage position is in position to cooperate with the gripping means 26. Although electrical and hydraulic lines have been omitted for reasons of clarity of illustration, they are all conducted through the hollow hub 39 to the interior of the head 14 which provides a convenient location for various control components. Certain other control components 49,50 are supported on a bracket 51 secured to the flange 40, as seen in both FIGS. 2 and 4.

Figure 4:
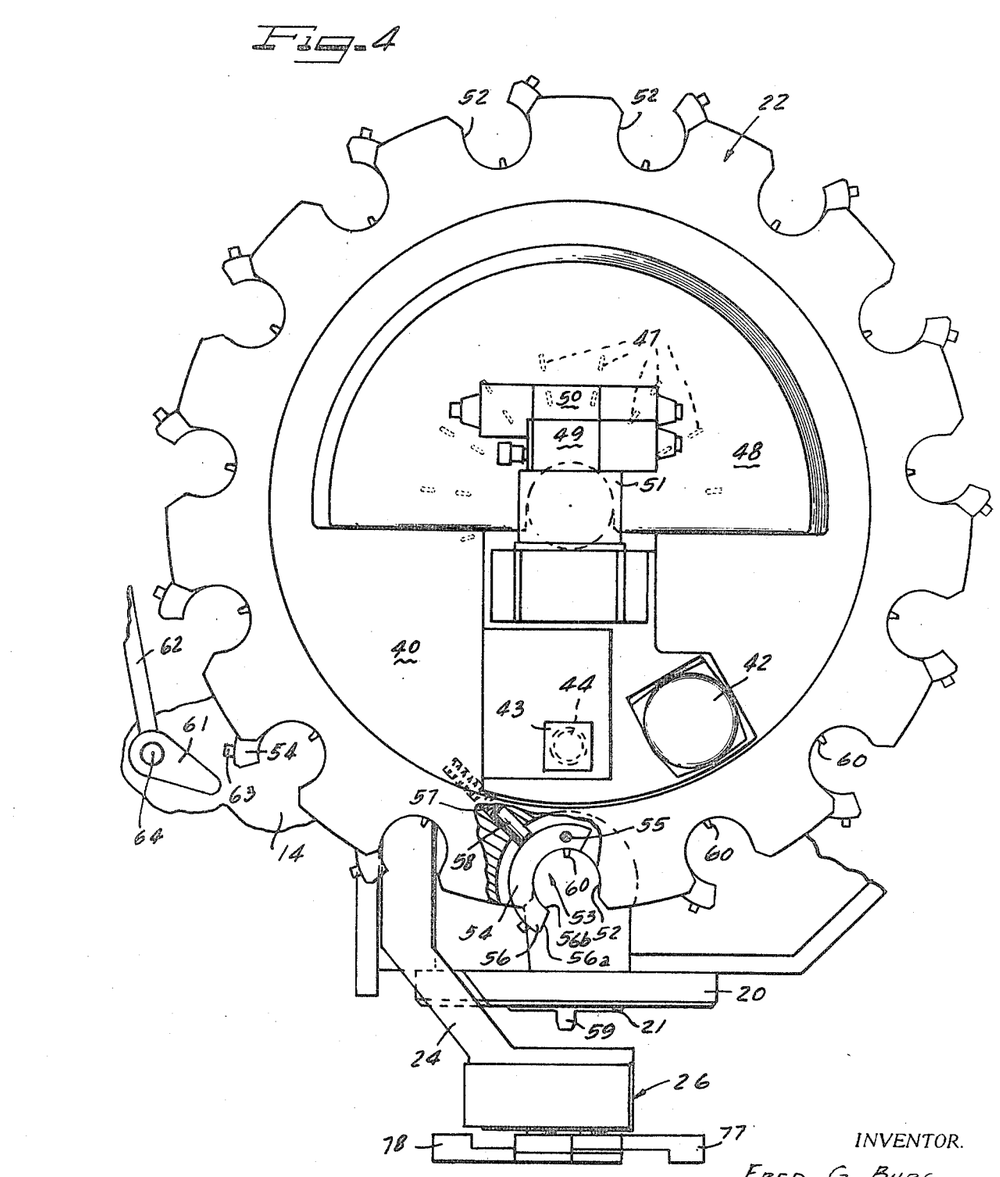
FIG. 4 is a side elevational view, still further enlarged, of the right tool storage magazine shown in FIG. 2 and shown in cross section in FIG. 3.

As seen in FIG. 4, the tool storage magazine 22 comprises a circular disc which is rotatable about a horizontal axis, and this axis passes through the axis of the spindle 21, the tool storage magazine 23 being driven about the same horizontal axis. The tool storage magazine 22, as seen in FIG. 4, has a series of peripheral pockets 52 which are radially apertured and within which a series of tools can be stored, the tool adapters 36 respectively fitting into the pockets 52. Each pocket 52 is provided with a resiliently loaded detent mechanism 53 which comprises a curved lever 54 that is pivoted at one end at 55 and which projects outwardly of the disc at 56. A spring 57 and plunger 58 provide a yieldable bias for the lever 54. The end 56 has surfaces 56a and 56b which partially close the pocket 52 and which engage the tool adapter 36 in storage and in transfer. When a tool adapter is inserted in the pocket 52, it engages the surface 56a which yields out of the way until the adapter 36 has entered the pocket 52 whereupon the lever 54 returns.

During tool transfer to and from the tool storage magazine 22, the actuator 28 that drives the tool transfer arm 24 provides the force through the tool adapter 36 that overrides or overpowers the detent mechanism 53, the spring 57 being sufficiently strong to hold the heaviest adapter-tool combination that would be employed in this machine tool 10.

The spindle 21 has at least one drive lug 59 which is eccentric to the rotational axis of the spindle 21 and which engages in an appropriate slot or groove in the adapter 36. In order to facilitate proper alignment during tool transfer, the pockets 52 are therefore each provided with an angular locating means, here comprising a radially projecting pin 60 that is rigidly secured to the circular disc and which is received within a coacting recess in the tool adapter 36.

When setting up the machine tool 10, it is necessary to provide the proper selection of tools in the proper pockets 52 which are suitably numbered in relationship to the controls 47 so that a given program will be properly executed. However, where a tool breaks or needs to be replaced, it is usually inconvenient to use the tool transfer arms 24,25 for loading and unloading the tool storage magazines 22,23. Therefore, to enable manual loading and unloading of the tool storage magazine 22, there is provided a tool release arm 61 pivotally supported on the head 14 and having an appropriate actuating lever 62. The release arm 61 is spring loaded so that it normally is disposed as shown in FIG. 4 where the arm 61 clears the various levers 54. However, each lever 54 is provided with a projection 63 which is engaged by the arm 61 when the lever 62 is actuated, thereby enabling manual compression of the spring 57 and hence release or insertion of a tool in such pocket. The tool release arm 61 is located near the front of the machine tool so as to facilitate manual access thereto. The arm 61 and the lever 62 are spaced axially apart on a rod 64 secured to the head 14 and shown in FIG. 2 where the arm 64 and lever 62 have been omitted for reasons of clarity.

Figures 5, 6, 7, 8:
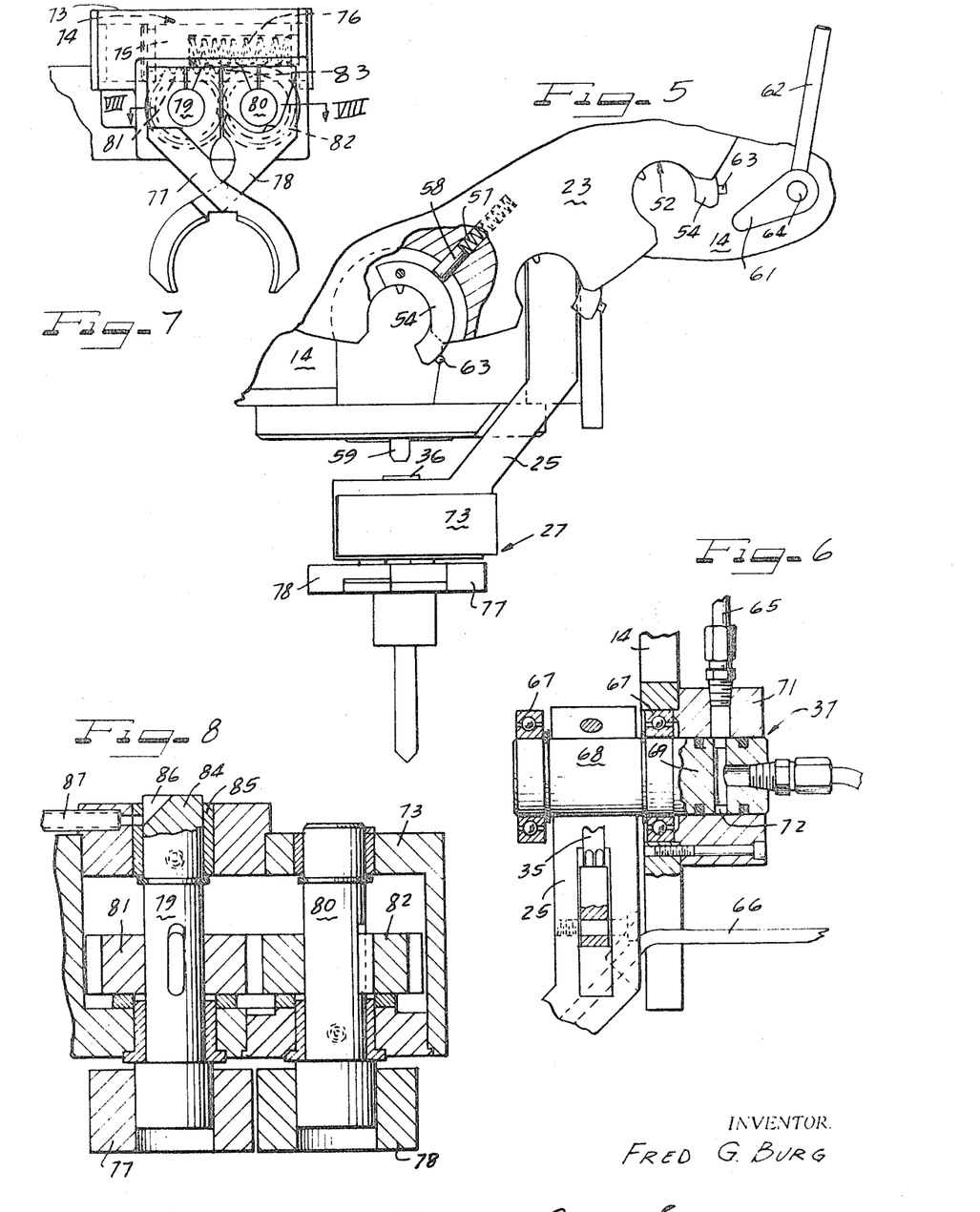
FIG. 5 is a fragmentary cross-sectional view corresponding to FIG. 4 but showing a portion of the left tool storage magazine shown in FIG. 2.
FIG. 6 shows an enlarged cross-sectional view taken substantially along the line VI—VI of FIG. 2.
FIG. 7 is a fragmentary view taken substantially along line VII—VII of FIG. 2, but with the tooling omitted.
FIG. 8 is an enlarged cross-sectional view taken along line VIII—VIII of FIG. 7.

The structure of the tool storage magazine 23 is a mirror image of the structure of the tool storage magazine 22, and therefore a detailed description thereof is not necessary. However, a fragmentary portion thereof is shown in FIG. 5 where the same reference numerals identify the same components. So also, a second tool release arm 61 and operating lever 62 are provided to cooperate with projections 63, and are supported on a second shaft 64 secured to the left side of the head 14.

GRIPPING MEANS

The gripping means 26,27 are similar to each other except that one is the mirror image of the other. Both of the gripping means 26,27 are fluid-pressure operated, and to that end a hydraulic line 65 leads to the rotary coupling 37 and then via a branch 66 to the gripping means 27. The tool transfer arm 25 is pivotally supported by a pair of bearings 67,67 which in turn are supported by the head 14, there being a shaft 68 in the tool transfer arm 25 that engages said bearings 67,67. The shaft 68 has an integral extension which comprises the rotatable portion 69 of the rotary coupling 37, the coupling 37 further including a fixed cylindrical portion 71 secured to the head 14. The hydraulic line 65 is connected through a fitting to an opening in the fixed coupling portion 71, while the rotatable portion 69 has a peripheral groove 72 that communicates with a fitting on the line branch 66. Thus both ends of the line branch 66 are fixed with respect to the tool transfer arm 25 and pivot therewith about the same axis.

The line branch 66 leads to a casing 73 which contains a moving means 74 here comprising a hydraulic actuator shown in FIG. 7. The outer part of the casing serves as a cylinder within which there is disposed an elongated movable piston 75. Pressure fluid enters the left end of the actuator 74 as shown in FIG. 7 to urge the piston 75 to the right, thereby compressing a spring 76, contained within the piston, the limit of travel being defined, for example, by the piston's 75 engaging the end of the cylindrical bore.

On the casing 73 there is pivoted a pair of movable coacting fingers 77, 78. The fingers 77,78 are pivotally supported on the casing 73 at one end by a pair of shafts 79,80 best seen in FIG. 8. A pair of gears 81,82 enmeshed with each other are respectively keyed to the shafts 79,80. The piston 75 has a series of gear teeth 83 constructed as a rack, and the teeth of the gear 81 project through a slot in the casing 73 to mesh with the rack teeth 83. The piston is suitably cut away so that the teeth of the gear 82 engage only the teeth of the gear 81. Thus the hydraulic actuator acts directly on only one finger 77 by means of the rack teeth 83 while the gear 81 drives the gear 82.

Fluid pressure thus not only biases the spring 76 but holds the crossed fingers 77,78 in a tool-gripping position. On release of pressure, the spring 76 returns the piston 75, and thereby biases the fingers 77,78 to a tool-releasing position. The coacting fingers 77,78 each have an arcuate tool engaging portion at the ends opposite to their shafts 79,80 and have intermediate portions that cross over one another. By this arrangement, when the gripping means 27 is released, the finger 77 moves in a counterclockwise and the finger 78 moves in a clockwise direction to provide a generous clearance for the quill 20 and also within the storage magazine 23.

The gripping means 26,27 are in a down and open position as shown in FIG. 4 during maching. They then move to the closed or tool-gripping and holding position such as shown in FIGS. 5 and 7 with the tool transfer arm 27 still in its down position. After retraction of the quill, and during movement of the tool transfer arm 25 to its second or upper position, the gripping means 26,27 remain closed, namely in the holding position. Once the tool has been returned to the tool storage magazine, the fingers 77,78 are then moved to a releasing or open position with the arm 24 or 15 disposed adjacent to the respective tool storage magazine. After rotation of the tool storage magazine to bring the next tool to be taken therefrom in line with the gripping means, the procedure described is reversed so that a tool is gripped and held in the tool storage magazine, is then continued to be held as the tool transfer arm moves to its down position, and is thereafter released after the tool adapter has been engaged with the spindle 21.

As shown in FIG. 8, the shaft 79 has a bearing portion 84 disposed in a bearing 85 in the casing 73, the other end of the shaft 79 and the ends of the shaft 80 being similarly supported. In addition, the bearing portion 84 has an air vent or slot 86 which is alignable with each of two air conduits 87 (one not shown as it is angularly spaced less than 180° from the one shown) which extend radially through the bearing 85. The slot 86 is so arranged as to vent both conduits 87 except at the limits of travel, when one or the other air conduits 87 is blocked to enable pressure buildup, which is sensed to indicate that the fingers 77,78 are in a predetermined position, such as shown in FIG. 7. This structure thereby interfaces the gripping means with the control system.

QUILL AND SPINDLE DRIVE

A motor 88 shown in FIG. 1 is carried by the frame 11 to move the head 14 up and down. The head 14 carries two additional motors shown in FIG. 9, namely a relatively large motor 89 for rotating the spindle 21 and a smaller motor 90 for reciprocating the quill 20.

The head 14 has a guide bore 91 which slidably guides the quill 20 for vertical movement parallel to the direction in which the head 14 can move. The head 14 further includes internal vertical track means 92 which are straddled by a pair of roller means 93 on the quill to restrain the quill 20 against any angular movement about the rotational axis of the spindle 21.

The quill 20 supports the spindle 21 for rotation within the quill, doing so in a manner that renders the quill and the spindle comovable vertically. Thus vertical movement of the quill 20 moves the spindle 21 vertically a like amount.

The quill motor 90 has a pulley 94 about which a belt 95 extends to drive a pulley 96 that is coaxial with the spindle 21. The pulley 96 is corotatably secured to a threaded shaft 97 which has a threaded connection with a nut 98 that is fixably secured to the upper end of the quill 20. The motor 90 is reversible and the threaded shaft 97 is axially fixed, whereby through the nut 98, the entire quill assembly is vertically reciprocated. Reciprocation forces are thus applied concentrically with the tool so that during the feeding of the tool, there is no tendency for the quill to cock or rock within whatever clearance is inherently necessary for its guiding support.

A brake 99 is disposed at the upper end of the rotatable screw 97, is of conventional construction, and is arranged to act between the screw 97 and the head 14. In addition, there is secured to the rotatable screw 97, a reader 100 of conventional construction for emitting signals to the control system which indicate actual rotation of the screw 97. A pulley 101 is secured to the output shaft of the quill motor 90 for driving a further control sensing element that is in the control circuit of the motor 90.

A cam and switch structure is provided which forms part of the control means for regulating the vertical axial movements of the quill 20. To this end, a series of switches 102 is supported on the head 14 with their actuators extending to the interior thereof at a point near the upper end of the retracted quill 20, and a series of additional switches 103 are disposed therebelow near the upper end of the extended quill 20. A series of five cams 104a–104e is secured to the upper end of the quill 20 as seen in each of FIGS. 2, 3 and 9. The control means for vertically positioning the quill 20 are responsive to both the reader 100 and to the mechanism driven by the head motor 88 in combination, so that if a relatively crude or inexpensive drive is utilized in association with the head motor 88, compensation is made automatically by signals obtained from the reader 100.

Figure 9:
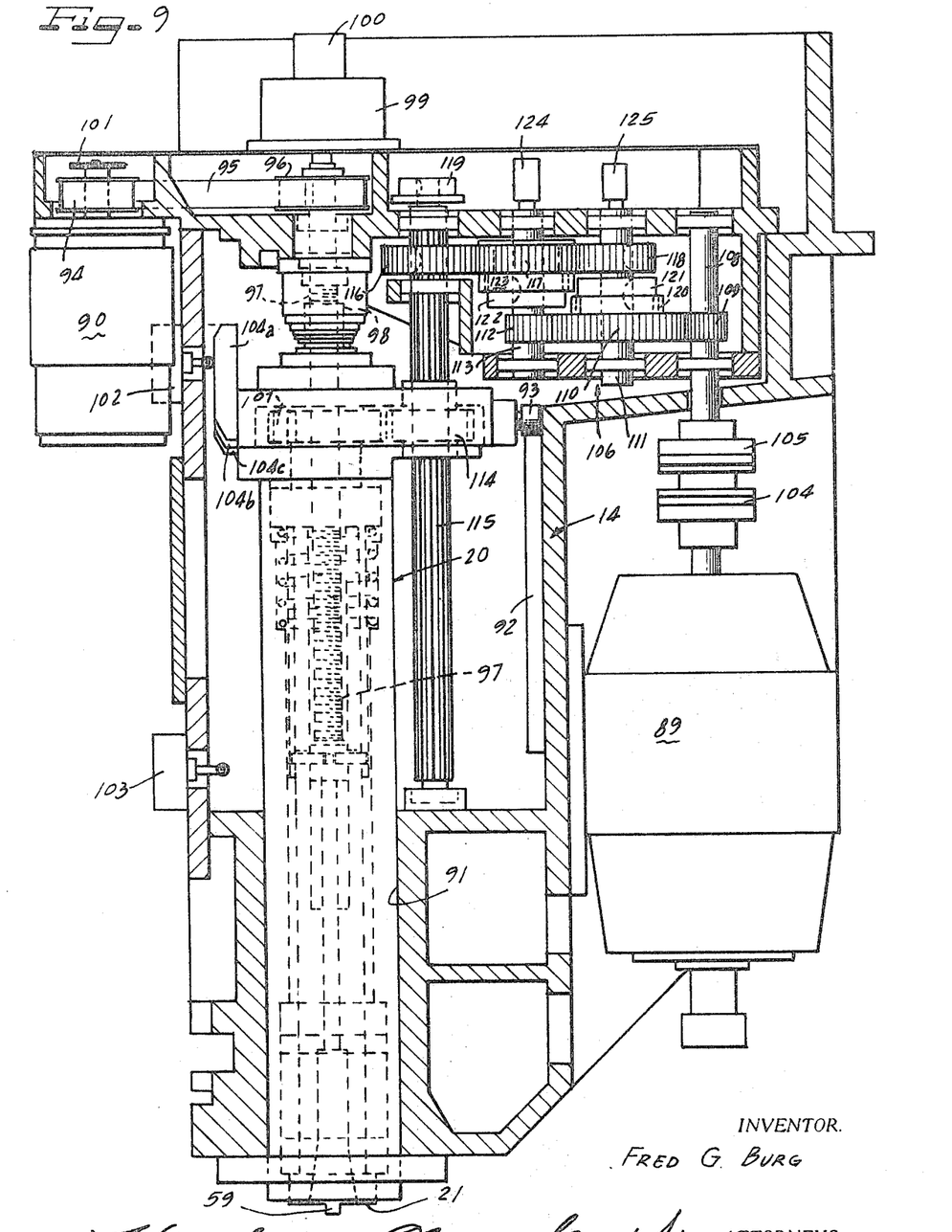
FIG. 9 is an enlarged cross-sectional view taken substantially along line IX—IX of FIG. 2.

The cam 104c closes a control circuit by which the quill 20 is advanced slowly from the fully retracted position shown in FIG. 9 to a partially extended position to mate with the tool adapter such as shown in FIG. 2. The cam 104b signals the presence of the quill 20 in the tool changing position. The cam 104a is provided for contingency purposes so that if the cam 104b should fail to effect stoppage of quill movement at the tool change position, a slight additional travel will place the cam 104a in service for the same purpose. There are five switches 102 and two switches 103.

The spindle motor 89 normally operates continually and is supported on on the head 14. It has an output shaft that is connected through a pair of couplings 104,105 to a gear train generally indicated at 106. The spindle 21 has a gear 107 at its upper end within the upper end of the quill 20, and the gear train 106 is drivably connected to the spindle gear 107 to rotate the spindle.

The gear train 106 includes an input shaft 108 to which is secured a gear 109. The gear 109 is enmeshed with a gear 110 rotatably carried on a shaft 111. The gear 110 is enmeshed with a gear 112 that is corotatably carried on a shaft 113. The gears 109,110 and 112 constitute a first branch of gearing that is connected to the spindle motor 89, the gears of which thus are all normally rotating continuously. The spindle gear 107 is driven by a gear 114 with which it meshes and which is trapped in the upper part of the quill 20 eccentrically to the rotational axis of the spindle. The gear 114 is internally splined and mates with an elongated splined shaft 115. That portion of the gear 114 which has the internal or female splines is also referred to herein as a splined nut. Near the upper end of the splined shaft 115 there is corotatably secured thereto a gear 116 which meshes with a gear 117 which is rotatable on the shaft 113, the gear 117 meshing with a gear 118 which is corotatable with the shaft 111. The gear 114 has one-half the number of teeth of the gear 107 where there are two lugs 59. Thus an indicator 119 at the upper end of the splined shaft 115 will for each revolution indicate the presence of one of the lugs 59, which are diametrically opposed, in a predetermined position. Where only one lug 59 is utilized, the gears 107 and 114 have the same number of teeth. The gears 114,116,117 and 118 comprise a second branch of gearing in the gear train 106 that is continuously enmeshed serially with the spindle gear 107.

The gear train 106 includes clutch means which selectively connect the first branch of gearing with the second branch of gearing. More specifically, in this embodiment, the clutch means comprises two separate clutches. On energizing of one of the clutches, a first speed ratio is obtained, and on energizing the second of the clutches, a second speed ratio is obtained. On energizing both of the clutches simultaneously, the gear train locks and hence locks the spindle position against any rotation. A first of the clutches includes a normally rotating part 120 which is corotatably secured to the gear 110 and which coacts with a driven portion 121 which is keyed to the shaft 111. If neither clutch is energized, then the shafts 108 and 113 rotate, and when the clutch 120, 121 is engaged, the shaft 111 is caused to rotate and as the gear 118 is corotatably secured thereto, the second branch of gearing is operated. This constitutes the low ratio speed range. The second clutch includes a portion 122 which is keyed to the normally rotating shaft 113, and hence this portion of the clutch also rotates continuously. The other portion 123 of the second clutch is corotatably secured to the gear 117 of the second branch. Therefore, whenever the second clutch 122, 123 is engaged, power is transmitted from the gear 112, through the shaft 113, the clutch 122,123 and the gear 117 to the second branch. This motor operation produces a higher gear ratio. It is to be noted that the gear 117 will also drive the gear 118 and hence the shaft 111, but as the clutch 120,121 is disengaged, there will merely be relative movement between the portions 121 and 120. So also, when the clutch 120,121 is engaged, the gear 117 will be driven by the gear 118 and with it the clutch portion 123, while the clutch portion 122 will be continuously rotated at a different rate by the shaft 113. Therefore, upon energization of both clutches, the gear train locks up to provide braking of the spindle 21.

Each of the shafts 108,111,113 and 115 are supported at their ends in bearings carried by the head 14. In addition, the shafts 111 and 113 are provided with suitable fittings 124,125 through which clutch-engaging energy is transmitted.

The quill 20 can be clamped in any selected position. To this end, as shown in FIG. 3, adjacent the lower end of the quill 30 there is provided a split clamping ring 126 which encircles the quill 20 and which has a downwardly facing frusto-conical surface 127 which is engaged by an upwardly directed frusto-conical surface 128 carried by a ring 129 to which is secured a cylindrical piston 130. Fluid pressure is applied through a port 131 to urge the piston 130 upwardly and hence the ring 129 upwardly to compress the split clamping ring 126. When pressure is relieved, a number of springs 132 move the piston 130 downwardly.

Although various minor modifications may be suggested by those versed in the art, it should be understood that I wish to embody within the scope of the patent warranted hereon, all such embodiments as resonably and properly come within the scope of my contribution to the art.

I claim as my invention:

1. A machine tool comprising:
   a. a head;
   b. a rotatably-driven axially-movable spindle slidably mounted on said head and adapted to drivably carry a tool;
   c. a pair of spaced tool storage magazines having said spindle disposed therebetween and mounted on said head for driven rotation about a common axis lying in a plane perpendicular to the rotational axis of said spindle and each adapted to store a series of tools;
   d. a pair of separate tool transfer arms, one for each said magazine and each mounted on said head in spaced relation to each other for driven movement between first and second positions; and
   e. gripping means on each of said transfer arms oriented to hold a tool coaxially with the rotational axis of said spindle when the associated transfer arm is in its said first position, and oriented to grip a tool in its tool storage magazine when the associated transfer arm is in its said second position.

2. A machine tool according to claim 1 in which the spindle axis is vertical and said common axis of said magazines is horizontal.

3. A machine tool according to claim 1 in which the spindle axis and the common axis of said magazines lie in a single vertical plane.

4. A machine tool according to claim 1 in which at least one of said magazines comprises a circular disc having peripheral pockets opening radially outwardly, there being a resiliently loaded detent mechanism for each pocket for holding a tool therein, each said detent mechanism being overriden by force from the associated transfer arm during transfer of a tool at the respective pockets.

5. A machine tool according to claim 4 including means in each of said pockets for locating the tool in a predetermined angular position about the tool's rotational axis.

6. A machine tool according to claim 5 in which said locating means comprises a radially projecting pin.

7. A machine tool according to claim 4 in which said detent mechanism is a yieldably biased lever pivoted at one end on said magazine, its opposite end having surfaces disposed to partially close said pocket and to engage the tool during tool storage and during tool transfer, respectively.

8. A machine tool according to claim 7 in which each of the levers of the detent mechanisms has a projection that extends beyond said circular disk, and a tool release arm carried on said head and movable from a retracted position to a position of engagement with one of said projections on one of said levers to move said one lever against its bias for facilitating manual tool transfer at a pocket.

9. A machine tool according to claim 4 including a tool release arm on said head and engageable with each of said detent mechanisms to override it.

10. A machine tool according to claim 1 including:
    a. at least one hub fixed at one end to said head;
    b. a flange fixedly secured to the opposite end of said hub;
    c. one of said tool storage magazines being rotatably carried on said hub and having a ring gear thereon; and
    d. a motor secured to said flange in driving engagement with said ring gear.

11. A machine tool according to claim 10, including:
    a. an actuator secured to said flange;
    b. a reciprocable shot pin connected to said actuator; and
    c. a series of holes in said tool storage magazine, each receptive of said shot pin and each adapted to locate one of the series of tools to be acted on by said gripping means.

12. A machine tool according to claim 1, including:
    a. a quill rotatably supporting said spindle and slidably mounted on said head for enabling the axial movement of said spindle; and
    b. cam and switch means carried by said quill and said head and responsive to the axial position of said quill and forming part of control means for moving said quill axially.

13. A machine tool according to claim 12, including a frame slidably supporting said head for vertical movement parallel to the axial movement of said quill.

14. A machine tool according to claim 13 in which said control means is responsive to both the axial position of said quill and in combination with the vertical position of said head to control the quill movements.

15. A machine tool according to claim 1 in which each of said transfer arms has a separate pivotal connection with said head, a portion of said arm being substantially vertical in said first position and horizontal in said second position.

16. A machine tool according to claim 1 in which each of said transfer arms is separately pivoted at one end on said head, and carries said grippingmeans at the opposite end; and each arm having a separate fluid actuator acting between said head and said arm.

17. A machine tool according to claim 16 in which said fluid actuator has a cylinder pivoted on said head and a rod connected to said arm intermediate the ends of said arm.

18. A machine tool according to claim 1 in which at least one of said transfer arms has a pivotal connection with said head for the support of the transfer arm, said connection being axially fixed with respect to said storage magazine, said gripping means on said one arm being hydraulically actuatable, and including relatively rigid hydraulic tubing leading from said head to said gripping means on said one arm, said hydraulic tubing being connected to a rotary coupling fluidly independent of and concentric with said pivotal connection.

19. A machine tool according to claim 18 in which said pivotal connection and said rotary coupling have fixed portions joined together, and rotatable portions joined together.

20. A machine tool according to claim 1 in which said gripping means comprises:
 a. a pair of comovable coacting fingers each having a tool-engaging portion;
 b. means supporting said fingers and enabling their movement to a tool gripping and holding position in said second transfer arm position, their maintaining said holding position in said first transfer arm position, and their movement to a tool releasing position upon return to said second transfer arm position; and
 c. means for moving said fingers simultaneously. casing, 21. A machine tool according to claim 20, in which said gripping means has a casing, each of said fingers being pivotably supported on said casing.

22. A machine tool according to claim 21, in which said tool engaging portion of each finger is at one end thereof, in which the pivotable support is at the other end thereof, each finger having an intermediate portion which crosses over that of the other.

23. A machine tool according to claim 21 which includes gear teeth on each of said fingers meshed together, said moving means acting directly on only one of said fingers.

24. A machine tool according to claim 23, said moving means having teeth acting directly on said gear teeth of said one of said fingers.

25. A machine tool according to claim 20, in which said moving means comprises a hydraulic actuator and including a spring biasing the piston of said actuator in a direction to bias said fingers toward one of their positions.

26. A machine tool according to claim 21, in which the pivotal support for one of said fingers is provided by a shaft having a bearing portion supported by a bearing in said casing, said casing bearing having at least one air conduit extending radially therethrough, and said bearing portion having an air vent and an imperforate portion alternatively alignable with said air conduit when said shaft is in a predetermined angular position, whereby an actual position of said gripping means may be sensed.

27. A machine tool according to claim 1, including:
 a. a spindle motor secured to said head;
 b. a gear corotatably secured to said slidable spindle; and
 c. a gear train having clutch means connecting said spindle motor to said spindle gear.

28. A machine tool according to claim 27, including:
 a. a quill rotatably supporting said spindle and slidably mounted on said head for enabling the axial movement of said spindle; and
 b. said gear train including a splined shaft and nut connection eccentric to the rotational axis of said spindle.

29. A machine tool according to claim 28, including:
 a. a quill motor secured to said head;
 b. a threaded nut and screw connection having one portion thereof coaxially and non-rotatably secured to said quill; and
 c. a driving connection between said quill motor and a rotatable portion of said threaded screw and nut connection, whereby force for advancing said quill is applied concentrically with the tool.

30. A machine tool according to claim 29, including a brake operatively connected to said rotatable portion of said threaded screw and nut connection.

31. A machine tool according to claim 29, including a reader connected to said rotatable portion of said threaded screw and nut connection for providing position signals to a control system.

32. A machine tool according to claim 28, including track means on said head engaged by roller means on said quill for restraining said quill against angular movement about the rotational axis of said spindle.

33. A machine tool according to claim 27 in which said gear train includes:
 a. a first branch of gearing connected to said spindle motor for being continually driven thereby;
 b. a second branch of gearing connected to said spindle gear; and
 c. two clutches connecting said branches together such that actuation of one clutch effects one spindle speed, actuation of the other clutch effects a second spindle speed, and actuation of both clutches effects spindle braking.

34. A machine tool according to claim 27, including an indicator means connected to be rotated whenever said spindle gear is rotated for indicating the angular position of said spindle.

35. A machine tool according to claim 1, including:
 a. a quill rotatably supporting said spindle and slidably mounted on said head for enabling the axial movement of said spindle; and
 b. clamp means on said head and encircling said quill adjacent to where said quill emerges from said head.

36. A machine tool according to claim 35 in which said clamp means comprises a split ring encircled by a clamp ring, there being a frusto-conical surface on at least one of said rings engaged by the other of said rings, and means for moving said clamp ring.

37. A machine tool according to claim 35 in which said clamp ring comprises a split ring encircled by a clamp ring, said rings having mating frustoconical surfaces, said clamp ring having a tubular piston integral therewith received in a complementally shaped cylinder bore in said head for being pressurized.

38. A machine tool according to claim 37 including return means acting between said head and at least one of said rings.

* * * * *